United States Patent
Funk et al.

(10) Patent No.: US 9,002,587 B2
(45) Date of Patent: Apr. 7, 2015

(54) METHOD AND DEVICE FOR ADJUSTING A BEAM DIRECTION OF A HEADLIGHT, AND MOTOR VEHICLE

(75) Inventors: Christian Funk, Beilngries (DE); Alfons Siedersbeck, Offenberg (DE)

(73) Assignee: Audi AG, Ingolstadt (DE)

( * ) Notice: Subject to any disclaimer, the term of this patent is extended or adjusted under 35 U.S.C. 154(b) by 36 days.

(21) Appl. No.: 14/002,551

(22) PCT Filed: Mar. 1, 2012

(86) PCT No.: PCT/EP2012/000881
§ 371 (c)(1),
(2), (4) Date: Aug. 30, 2013

(87) PCT Pub. No.: WO2012/116813
PCT Pub. Date: Sep. 7, 2012

(65) Prior Publication Data
US 2013/0338884 A1 Dec. 19, 2013

(30) Foreign Application Priority Data
Mar. 2, 2011 (DE) .......................... 10 2011 012 792

(51) Int. Cl.
*B60R 22/00* (2006.01)
*B60Q 1/12* (2006.01)

(52) U.S. Cl.
CPC .......... *B60Q 1/122* (2013.01); *B60Q 2300/112* (2013.01); *B60Q 2300/122* (2013.01); *B60Q 2300/322* (2013.01)

(58) Field of Classification Search
None
See application file for complete search history.

(56) References Cited

U.S. PATENT DOCUMENTS

| 5,660,454 A | * | 8/1997 | Mori et al. ..................... 362/466 |
| 6,134,509 A | | 10/2000 | Furusho et al. |
| 2013/0051041 A1 | * | 2/2013 | Mohamed ..................... 362/466 |

FOREIGN PATENT DOCUMENTS

| DE | 198 03 043 A1 | 8/1998 |
| DE | 20 2004 010 944 U1 | 11/2004 |
| DE | 10 2005 022 677 A1 | 11/2006 |
| DE | 10 2005 044 049 A1 | 4/2007 |
| DE | 10 2008 019 069 A1 | 6/2009 |
| JP | 2000 297 840 A | 10/2000 |
| JP | 2009 220 623 A | 10/2009 |

OTHER PUBLICATIONS

International Search Report issued by the European Patent Office in International Application PCT/EP2012/000881.

* cited by examiner

*Primary Examiner* — Thomas Tarcza
*Assistant Examiner* — Adam Alharbi
(74) *Attorney, Agent, or Firm* — Henry M. Feiereisen LLC.

(57) ABSTRACT

A method for adjusting a beam direction of a headlight of a vehicle having at least one front wheel and at least one rear wheel includes the following steps: a) detecting a front wheel steering angle of the at least one front wheel; b) detecting a rear wheel steering angle of the at least one rear wheel; c) defining a beam direction of the headlight depending on the front wheel steering angle and the rear wheel steering angle; and d) adjusting the beam direction of the headlight to the defined beam direction. The adjustment depends on whether the rear-wheel steering angle and the front wheel steering angle are oriented in the same direction or in opposite directions.

13 Claims, 2 Drawing Sheets

METHOD AND DEVICE FOR ADJUSTING A BEAM DIRECTION OF A HEADLIGHT, AND MOTOR VEHICLE

CROSS-REFERENCES TO RELATED APPLICATIONS

This application is the U.S. National Stage of International Application No. PCT/EP2012/000881, filed Mar. 1, 2012, which designated the United States and has been published as International Publication No. WO 2012/116813 A1 and which claims the priority of German Patent Application, Serial No. 10 2011 012 792.5, filed Mar. 2, 2011, pursuant to 35 U.S.C. 119(a)-(d).

BACKGROUND OF THE INVENTION

The invention relates to a method for adjusting a beam direction of a headlight of a vehicle having at least one front wheel and at least one rear wheel. The invention also relates to a device for adjusting a beam direction of a headlight of a vehicle. Lastly, the invention relates to a vehicle with such a device.

For motor vehicles, it is common to use headlights having a fixed light distribution for a static illumination of the roadway. The light distribution is typically asymmetric, so that in countries with right-hand traffic the light distribution in front of the vehicle is cropped vertically on the left side by about 1%. In general, a compromise must be found for different road classes.

In addition, a so-called dynamic cornering light is known which pivots the light distribution to the inside of the turn based on the front axle steering angle. Expected curves can be anticipated with appropriate controllers of the vehicle electronics, so that the pivot angle of the headlights which are pivotable around their horizontal axis can be adjusted early to the expected road conditions. In this case, the speed of the motor vehicle is additionally taken into account, because the size of the pivot angle is typically reduced at high speeds. The yaw rate of the motor vehicle can also be used as input parameter for controlling the pivot angle. Pivoting is typically performed with suitable stepper motors.

DE 20 2004 010 944 U1 discloses an industrial truck with at least a working lighting device, wherein at least one device is provided for automatically changing the illumination region of the working illumination device in response to planned and/or performed changes in driving direction of the industrial truck.

SUMMARY OF THE INVENTION

It is an object of the invention to provide a method, a device and a motor vehicle, with which the beam direction of a headlight can be adapted even better to an expected cornering maneuver.

The method according to the invention is used for adjusting a beam direction of a headlight of a vehicle having at least one front wheel and at least one rear wheel. The method comprises the following steps:
   a) detecting a front wheel steering angle of the at least one front wheel;
   b) detecting a rear wheel steering angle of the at least one rear wheel;
   c) defining a beam direction of the headlight as a function of the front wheel turning angle and the rear wheel turning angle, and
   d) adjusting the beam direction of the headlight to the predetermined beam direction.

Front wheel steering angle refers in particular to a deflection angle of a front wheel of the vehicle in relation to a definable neutral position of this wheel. The same applies to the rear wheel steering angle in relation to a rear wheel. The respective neutral position is then defined especially for driving the vehicle in a straight line. A wheel steering angle usually causes cornering of the vehicle. In particular, the front wheel steering angle can be adjusted by a front axle steering of the vehicle, whereas for the adjustment of the rear wheel steering angle a suitable rear axle steering may be provided on the vehicle. The headlights may be designed so as to illuminate the area in front of the vehicle in the traveling direction of the vehicle. For adjusting the beam direction of the headlight, the headlight may be provided in particular in form of a so-called static or dynamic curve light. In particular, the beam direction of the headlight is defined as a function of both the front wheel steering angle and the rear wheel steering angle, i.e. not only as a function of one of the two wheel steering angles.

With the method according to the invention, the actual beam direction of the headlight can be adjusted even better to the expected cornering of the vehicle. For example, when a rear wheel steering angle is present and the beam direction would be adjusted only in response to a front wheel steering angle, the beam direction of the headlight would be adjusted with insufficient accuracy. An excessive adjustment of the beam direction would then be conceivable, which creates the risk that the area in front of the vehicle would be only insufficiently illuminated for the operator of the vehicle, or that other road users could be blinded. When the beam direction is insufficiently adjusted, the effect of a dynamic curve light is insufficiently configured and a curve ahead of the vehicle may be only poorly illuminated. By adjusting the beam direction very precisely and commensurate with the actual situation, an excellent illumination of the vehicle surroundings is always guaranteed, and traffic safety is greatly improved.

Preferably, the method comprises the additional step of determining a speed of the vehicle, wherein at step c) the beam direction of the headlight is additionally defined as a function of vehicle speed. This embodiment allows adjusting the beam direction of the headlight so as to even better match the actual driving situation. Very small curve radii are not expected at high speeds, so that the beam direction of the headlight need only be slightly corrected. Conversely, tighter turns may be realized at low speeds, so that the beam direction of the headlight must also be changed more in order to anticipate the expected curve by suitable illumination.

Preferably, the method includes the additional step of a defining a comparison beam direction of the headlight as a function of the front wheel steering angle, without taking into consideration the rear wheel steering angle. In a situation where the rear wheel steering angle and the front wheel steering angle are oriented in opposite directions in relation to a respective neutral position of the associated rear and front wheels, the beam direction is determined at step c) so that it is more strongly oriented in the direction of the front wheel steering angle in relation to the comparison beam direction. This describes a situation where the rear wheel and the front wheel are rotated in opposite directions, in particular with respect to a common neutral position, so that smaller turn radii may be realized than when the rear wheel remains in its neutral position and only the front wheel is pivoted by the same front wheel steering angle. The beam direction of the headlight would then also have to be more strongly corrected than commensurate with the actual front wheel steering angle. The beam direction of the headlight can thus be better adapted to the actually set curve radius.

Likewise, in a situation where the rear wheel steering angle and the front wheel steering angle are oriented in the same direction in relation to a respective neutral position of the associated rear wheel or front wheel, the beam direction is defined at step c) so that as to be less oriented in the direction of the front wheel steering angle compared to the comparison beam direction. This specifically describes the situation where the front wheel and rear wheel are pivoted in the same pivotal direction, and in particular by the same angle, with respect to a common neutral position. In this case, the vehicle would not drive through a curve despite pivoting of the wheels, but would travel in a straight line diagonal to the original direction of travel. In this situation, there is no need to anticipate a curve by adjusting the beam direction of the headlight, so that the necessary adjustment is smaller than corresponding to the actual front wheel steering angle.

Preferably, for defining the beam direction of the headlight at step c), a pivot angle of the headlight is defined substantially about the vertical axis of the vehicle, and the beam direction of the headlight is adjusted at step d) by pivoting about the defined pivot angle. In particular, the entire headlight or, for example, only a lens of the headlight may be pivoted horizontally. In particular, the pivot angle may be pivoted by a stepping motor mounted on the headlight. By pivoting the headlight, the beam direction of the headlight can be very easily and exactly adjusted.

Preferably, step c) may include the following sub-steps:
c1) determining a correction value from the rear wheel steering angle;
c2) determining a fictitious front wheel steering angle based on the front wheel steering angle and the correction value. In particular, the front wheel steering angle can be linked by way of a mathematical relationship or a characteristic curve with the correction value so as to produce the fictitious front wheel steering angle, and
c3) adjusting the beam direction of the headlight as a function of the fictitious front wheel steering angle.

Specifically, a rear axle steering angle can be regarded as a correction value of a front axle steering angle for calculating a pivot angle for a low beam light cone of the headlight. This embodiment allows a simple, yet very effective determination of the beam direction of the headlight.

Preferably, at step c), the beam direction of the headlight can be determined by using a single-track model. In particular, an extended single-track model with a steering rear axle can be used to calculate a correct pivot angle of the headlight. Single-track models are common in the automotive technology for modeling the behavior of dual-steering vehicles. Consideration of a rear wheel steering angle can be very easily implemented within such a model, while still resulting in very accurate predictions for a pivot angle of the headlight.

A device according to the invention is used to adjust a beam direction of a headlight of a vehicle having at least one front wheel and at least one rear wheel and includes:
an acquisition unit which is configured to acquire a front wheel steering angle of the at least one front wheel
a computing unit which is configured to determine a beam direction of the headlight as a function of the front wheel steering angle;
an actuating unit which is configured to adjust the beam direction of the headlight to the defined beam direction, wherein
the acquisition unit is configured to acquire a rear wheel steering angle of the at least one rear wheel, and
the computing unit is configured to determine the beam direction of the headlight as a function of the front wheel steering angle and the rear wheel steering angle.

The acquisition unit may include in particular suitable sensors for measuring pivot angles, wherein the sensors are attached to the front wheel and/or rear wheel or to a front axle and/or a rear axle and are adapted to acquire a front wheel steering angle and a rear wheel steering angle, respectively. In particular, the computing unit may be included in the acquisition unit. In particular, mathematical relationships or characteristic curves may be stored in the computing unit for the purpose of correlating the respective acquired front wheel steering angle and rear wheel steering angle with an actuation angle for the beam direction of the headlight. The actuation unit may be configured, in particular, as an actuator or stepper motor.

A motor vehicle according to the invention includes a device according to the invention.

The preferred exemplary embodiments illustrated with reference to the method according to the invention and their advantages apply likewise to the device according to the invention and the motor vehicle according to the invention.

BRIEF DESCRIPTION OF THE DRAWING

The invention will now be explained in more detail below with reference to exemplary embodiments, wherein.

DETAILED DESCRIPTION OF PREFERRED EMBODIMENTS

In the Figures, identical or functionally similar elements are designated with the same reference symbols.

Figure 1:
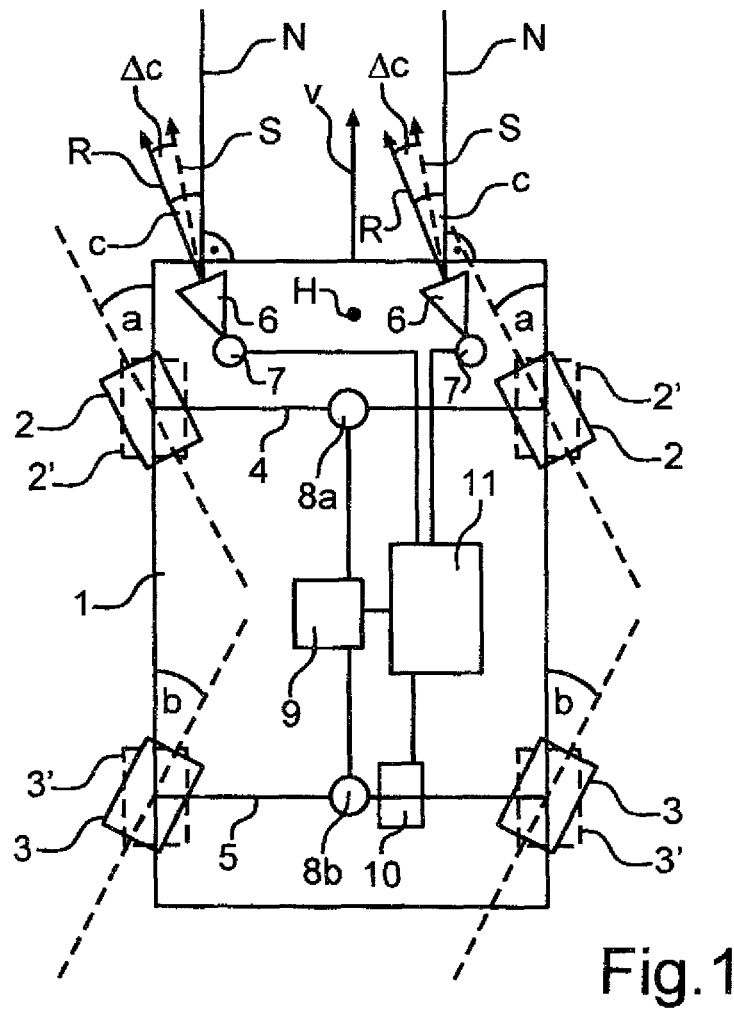
FIG. 1 shows a schematic plan view of a motor vehicle with front-axle steering and rear-axle steering and pivotable headlights.

FIG. 1 shows a motor vehicle 1 having a front axle 4 and a rear axle 5. Two front wheels 2 are disposed on the front axle 4, whereas two rear wheels 3 are disposed on the rear axle 5. In the exemplary embodiment, the motor vehicle 1 moves in the direction of the speed vector v. The longitudinal axis N of the motor vehicle 1 defines a neutral position of the front wheels 2 and rear wheels 3. This neutral position is indicated by the front and rear wheels 2' and 3', respectively, which are drawn with dashed lines.

In contrast to this neutral position, the front wheels 2 have a front wheel steering angle a. This front wheel steering angle a has a positive value. The rear wheels 3 are also pivoted with respect to the neutral position, namely by a rear wheel steering angle b. The rear wheel steering angle b has a negative value compared to the front wheel steering angle a. I.e., front and rear wheels 2 and 3 are pivoted or oriented in opposite directions.

Sensors 8a and 8b, respectively, which can be used to acquire the steering angle a and b, are attached on the front axle 4 and the rear axle 5. An acquisition unit 9, which is in turn connected to a computer 11, is provided for evaluating the sensor signals. The computer 11 can also control, for example, an electric motor 10, with which the rear wheels 3 can be pivoted.

According to the prior art, the computer 11 can be used to calculate a pivot angle c for pivotable headlights 6 of the motor vehicle 1 in response to the front wheel steering angle a. The beam direction R of the headlights 6 can be adjusted by a stepping motor 7 commensurate with the pivot angle c calculated by the computer 11. The pivot angle c is defined here as deflection angle with respect to the longitudinal axis N about the vertical axis H of the motor vehicle 1.

Until now, it was common practice to determine the pivot angle c only as a function of the front wheel steering angle a. If this conventional method is executed in the present situation, then the headlight 6 is pivoted only as far as to produce the comparison beam direction S. However, since the rear wheels 3 are also pivoted about the rear wheel steering angle b, this comparison beam direction S is inadequate for the actually set very tight curve radius. For this reason, the acquired rear wheel steering angle b is now additionally taken into consideration by the computer 11 in order to determine an improved beam direction R of the headlights 6. Due to the expected smaller curve radius, the beam direction R is corrected with respect to the comparison beam direction S towards the front wheel steering angle a by the pivot angle difference $\Delta c$, thus producing a total pivot angle c with respect to the longitudinal axis N.

To attain optimal pivoting of the low-beam light cone produced by the headlights 6 in every driving situation, the rear wheel steering angle b of the rear axle steering of the motor vehicle 1 is taken into consideration when calculating the pivot angle c. This is performed in the computer 11, which includes a light control unit that is connected to the acquisition unit 9 or the sensor 8b, respectively, via a CAN bus.

Figure 2:
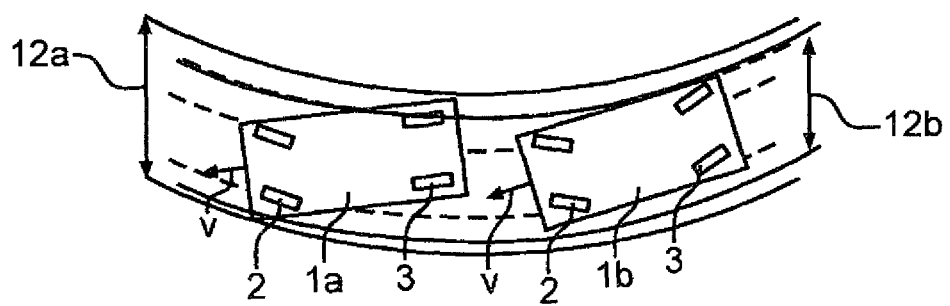
FIG. 2 shows a schematic diagram of the steering behavior of two motor vehicles.

FIG. 2 illustrates this situation once more. A motor vehicle 1a moves in the direction of the speed vector v, without its rear wheels 3 being steered. The rear wheels 3 thus remain in a neutral position in spite of the steered front wheels 2. The motor vehicle 1a thus moves in a curve inside the boundary 12a.

Conversely, the motor vehicle 1b has the rear axle steering enabled, so that the rear wheels 3 are pivoted in opposite directions relative to the front wheels 2. In this way, smaller curve radii can be attained and the motor vehicle 1b moves within the boundary 12b. A different pivot angle c should therefore be set for the motor vehicle 1b than for the motor vehicle 1a. However, if only the front wheel steering angle a, which is identical for the motor vehicles 1a and 1b, would be considered, then the same pivot angle c would result for both motor vehicles, which, however, would not be sufficiently accurate for the motor vehicle 1b.

Figure 3:
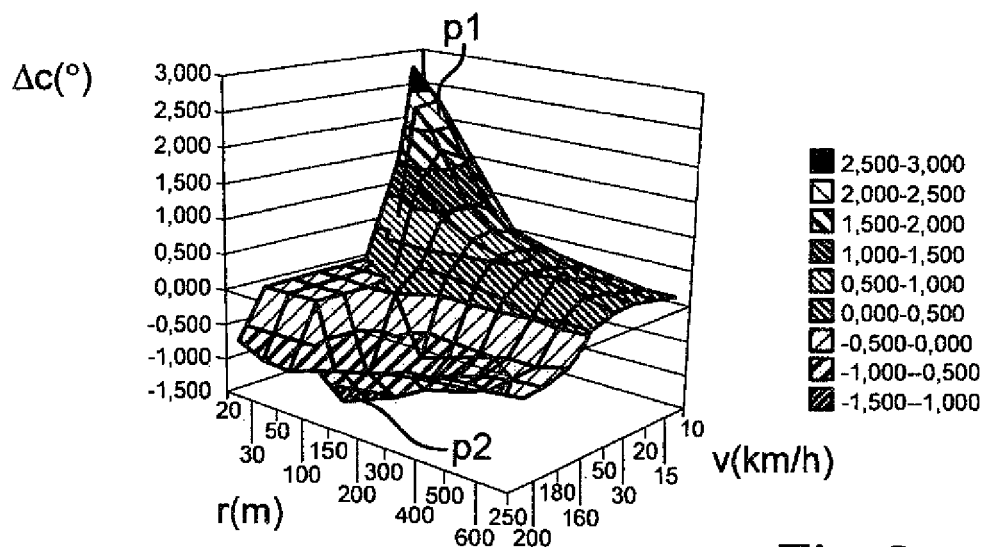
FIG. 3 shows the pivot angle difference of a pivotable headlight as a function of speed and curve radius.

Therefore, a characteristic curve according to FIG. 3 is provided in the computer 11. Plotted is the pivot angle difference $\Delta c$ of the beam direction R compared to the comparison beam direction S as a function of a curve radius and as a function of the vehicle speed v. Two points P1 and P2 within this characteristic curve will now be discussed with reference to FIGS. 4A and 4B.

Figures 4A, 4B:
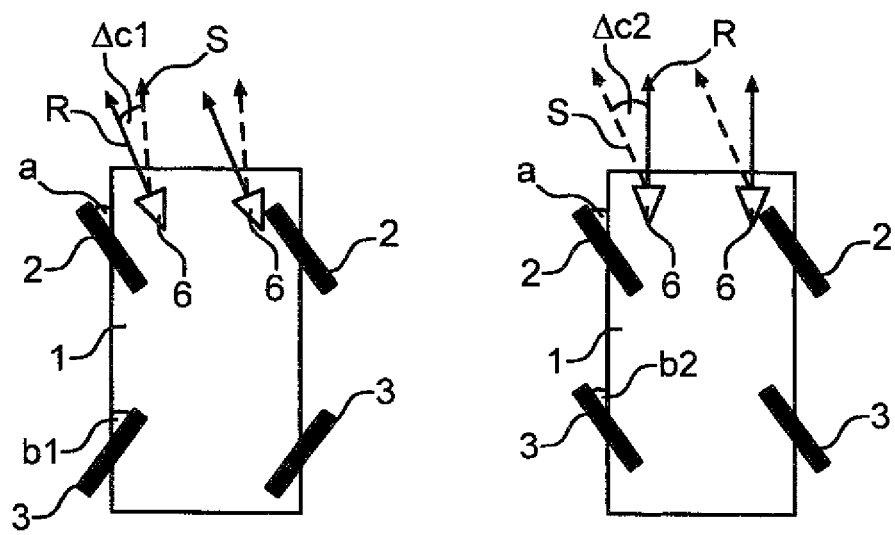
FIG. 4A shows a schematic plan view of a motor vehicle with front and rear wheels pivoted in opposite directions.
FIG. 4B shows a schematic plan view of a vehicle with front and rear wheels pivoted in the same direction.

FIG. 4A corresponds to point P1 in FIG. 3. FIG. 4A shows a situation where the rear wheel steering angle b1 and the front wheel turning angle a are oriented in opposite directions with respect to the corresponding neutral positions of the associated front wheel 2 and rear wheel 3. The front wheel steering angle a has a positive value, whereas the rear wheel steering angle b1 has a negative value. This results in a very small curve radius r. In addition, the speed v must be sufficiently small for this small curve radius due to dynamic driving reasons. When only a front wheel steering angle a were considered for pivoting the headlights 6, this would result in the comparison beam direction, which would, however, correspond to an excessively large curve radius r. Consequently, the beam direction R must be set so that it is oriented more toward the front steering angle a in relation to the comparison beam direction S. Therefore, an additional pivot angle difference $\Delta c1$ is defined as a function of the rear wheel steering angle b1. As seen in FIG. 3, this pivot angle difference $\Delta c1$ is about +2.5°.

Conversely, FIG. 4B corresponds to point P2 in FIG. 3. FIG. 4B shows a situation where the rear wheel steering angle b2 and the front wheel steering angle a are oriented in the same direction in relation to neutral position of each of the associated rear wheel 3 and front wheel 2. This position of the rear wheels 3 is particularly advantageous when driving the motor vehicle 1 at high speed on highways and switching lanes. A very large curve radius r is then realized and the motor vehicle 1 travels almost without any lateral acceleration from one lane to the next, providing a very comfortable ride for the passengers. In this case, both the front wheel steering angle a and the rear wheel steering angle b2 are positive. If only the front wheel steering angle a were considered for the dynamic cornering light produced by the headlights 6, the comparison beam direction S would result. However, strong pivoting of the headlamps 6 would not at all be necessary in this situation. By taking the rear wheel steering angle b2 into consideration, the computer 11 calculates a pivoting angle difference $\Delta c2$ to obtain a correction value for the actual beam direction R in relation to the comparison beam direction S. The pivot angle difference $\Delta c2$ has here a negative value and is approximately −1.3°, as can be seen in FIG. 3.

The low beam cone angle in the travel direction of the motor vehicle can be adjusted correctly by considering in both situations the rear axle steering angle, where the front axle and the rear axle are steered in either the same direction or in opposite directions. Conversely, when rear axle steering is installed and when only the wheel steering angle of the front axle is considered, the headlight 6 would be pivoted in the wrong direction or too little.

The invention claimed is:

1. A method for adjusting a beam direction of a headlight of a vehicle with at least one front wheel and at least one rear wheel, the method comprising the steps of:
   a) detecting a front wheel steering angle of the at least one front wheel,
   a1) defining a comparison beam direction of the headlight as a function of the front wheel steering angle without taking into consideration the rear wheel steering angle,
   b) detecting a rear wheel steering wheel angle of the at least one rear wheel;
   c) defining a beam direction of the headlight as a function of the front wheel steering angle and the rear wheel steering angle, wherein
      in the event that the rear-wheel steering angle and the front wheel steering angle are oriented in opposite directions in relation to a respective neutral position of the associated rear wheel or front wheel, the beam direction is defined at step c) so as to be oriented more strongly in the direction of the front wheel steering angle in relation to the comparison beam direction, and
      in the event that the rear-wheel steering angle and the front wheel steering angle are oriented in an identical direction in relation to the respective neutral position of the associated rear wheel or front wheel, the beam direction is defined at step c) so as to be oriented less strongly in the direction of the front wheel steering angle in relation to the comparison beam direction, and d) adjusting the beam direction of the headlight to the defined beam direction.

2. The method of claim 1, wherein step c) comprises the following sub-steps:
   c1) determining a correction value from the rear wheel steering angle;
   c2) determining a fictitious front wheel steering angle from the front wheel steering angle and the correction value; and
   c3) defining the beam direction of the headlight as a function of the fictitious front wheel steering angle.

3. A method for adjusting a beam direction of a headlight of a vehicle with at least one front wheel and at least one rear wheel, the method comprising the steps of:
   a) detecting a front wheel steering angle of the at least one front wheel,
   b) detecting a rear wheel steering wheel angle of the at least one rear wheel;
   c) defining a beam direction of the headlight as a function of the front wheel steering angle and the rear wheel steering angle, and
   d) adjusting the beam direction of the headlight to the defined beam direction,
   wherein step c) comprises the following sub-steps:
   c1) determining a correction value from the rear wheel steering angle;
   c2) determining a fictitious front wheel steering angle from the front wheel steering angle and the correction value; and
   c3) defining the beam direction of the headlight as a function of the fictitious front wheel steering angle.

4. The method according to claim 3, further comprising defining a comparison beam direction of the headlight as a function of the front wheel steering angle without taking into consideration the rear wheel steering angle, wherein
   in the event that the rear-wheel steering angle and the front wheel steering angle are oriented in opposite directions in relation to a respective neutral position of the associated rear wheel or front wheel, the beam direction is adjusted at step c) so as to be oriented more strongly in the direction of the front wheel steering angle in relation to the comparison beam direction,
   and
   in the event that the rear-wheel steering angle and the front wheel steering angle are oriented in an identical direction in relation to the respective neutral position of the associated rear wheel or front wheel, the beam direction is adjusted at step c) so as to be oriented less strongly in the direction of the front wheel steering angle in relation to the comparison beam direction.

5. The method of claim 1, further comprising determining a travel speed of the vehicle, wherein at step c) the beam direction of the headlight is additionally adjusted as a function of the driving speed.

6. The method of claim 3, further comprising determining a travel speed of the vehicle, wherein at step c) the beam direction of the headlight is additionally adjusted as a function of the driving speed.

7. The method of claim 1, wherein defining the beam direction at step c) comprises defining a pivot angle of the headlight about a vertical axis of the vehicle for adjusting of the headlight, and adjusting the beam direction at step d) comprises pivoting the beam direction of the headlight about the defined pivot angle.

8. The method of claim 3, wherein defining the beam direction at step c) comprises defining a pivot angle of the headlight about a vertical axis of the vehicle for adjusting of the headlight, and adjusting the beam direction at step d) comprises pivoting the beam direction of the headlight about the defined pivot angle.

9. The method of claim 1, wherein the beam direction of the headlamp is defined at step c) with assistance of a single-track model.

10. The method of claim 3, wherein the beam direction of the headlamp is defined at step c) with assistance of a single-track model.

11. A device for adjusting a beam direction of a headlight of a vehicle with at least one front wheel and at least one rear wheel, the device comprising:
    an acquisition unit configured to acquire a front wheel steering angle of the at least one front wheel and a rear wheel steering angle of the at least one rear wheel;
    a computing unit configured to define a beam direction of the headlight as a function of the front wheel steering angle and the rear wheel steering angle by
    determining a correction value from the rear wheel steering angle;
    determining a fictitious front wheel steering angle from the front wheel steering angle and the correction value; and
    adjusting the beam direction of the headlight as a function of the fictitious front wheel steering angle, and
    an actuating unit configured to adjust the beam direction of the headlight to the defined beam direction.

12. A device of claim 11, wherein the computing unit is further configured to define a comparison beam direction of the headlight as a function of the front wheel steering angle without taking into consideration the rear wheel steering angle, wherein
    in the event that the rear-wheel steering angle and the front wheel steering angle are oriented in opposite directions in relation to a respective neutral position of the associated rear wheel or front wheel, the beam direction is defined so as to be oriented more strongly in the direction of the front wheel steering angle in relation to the comparison beam direction,
    and
    in the event that the rear-wheel steering angle and the front wheel steering angle are oriented in an identical direction in relation to the respective neutral position of the associated rear wheel or front wheel, the beam direction is defined so as to be oriented less strongly in the direction of the front wheel steering angle in relation to the comparison beam direction.

13. A motor vehicle comprising the device according to claim 11.

* * * * *